United States Patent [19]

Meijer

[11] Patent Number: 5,553,195
[45] Date of Patent: Sep. 3, 1996

[54] DYNAMIC NEURAL NET

[75] Inventor: Peter B. L. Meijer, Eindhoven, Netherlands

[73] Assignee: U.S. Philips Corporation, New York, N.Y.

[21] Appl. No.: 315,158

[22] Filed: Sep. 29, 1994

[30] Foreign Application Priority Data

Sep. 30, 1993 [EP] European Pat. Off. .............. 93202792

[51] Int. Cl.⁶ ................................ G06E 1/00; G06E 3/00
[52] U.S. Cl. ................................................. 395/24; 395/21
[58] Field of Search ................................... 395/20, 21, 24

[56] References Cited

U.S. PATENT DOCUMENTS

| | | | |
|---|---|---|---|
| 4,974,169 | 11/1990 | Engel | 364/513 |
| 5,170,071 | 12/1992 | Shreve | 395/27 X |
| 5,200,898 | 4/1993 | Yuhara et al. | 364/431.05 |
| 5,285,522 | 2/1994 | Mueller | 395/2.41 |

FOREIGN PATENT DOCUMENTS

| | | | |
|---|---|---|---|
| 0528399 | 2/1993 | European Pat. Off. | G06F 15/80 |
| 0540168 | 5/1993 | European Pat. Off. | G05B 23/02 |

OTHER PUBLICATIONS

Doya, K, "Learning Temporal PAtterns in Recurrent Neurla Networks," IEEE, SMC Conf. 1990, pp. 170–172.

Primary Examiner—Raymond J. Bayerl
Assistant Examiner—A. Katbab
Attorney, Agent, or Firm—Debra K. Stephens

[57] ABSTRACT

An information processing system includes a feed-forward neural net that is functionally comprised of a plurality of interconnected neurons. At least a particular one of the neurons is operative to receive a plurality of input signals for in response thereto producing an output signal that is a function of the input signals, and of at least one of following quantities: a rate of change of at least one of the neuron input signals; a rate of change of the particular neuron output signal. The net exhibits dynamic behavior as represented by signal-dependent delays, signal dispersion and phase shifts. The net can be trained to display stimulus-response characteristics of substantially any dynamic system.

13 Claims, 7 Drawing Sheets

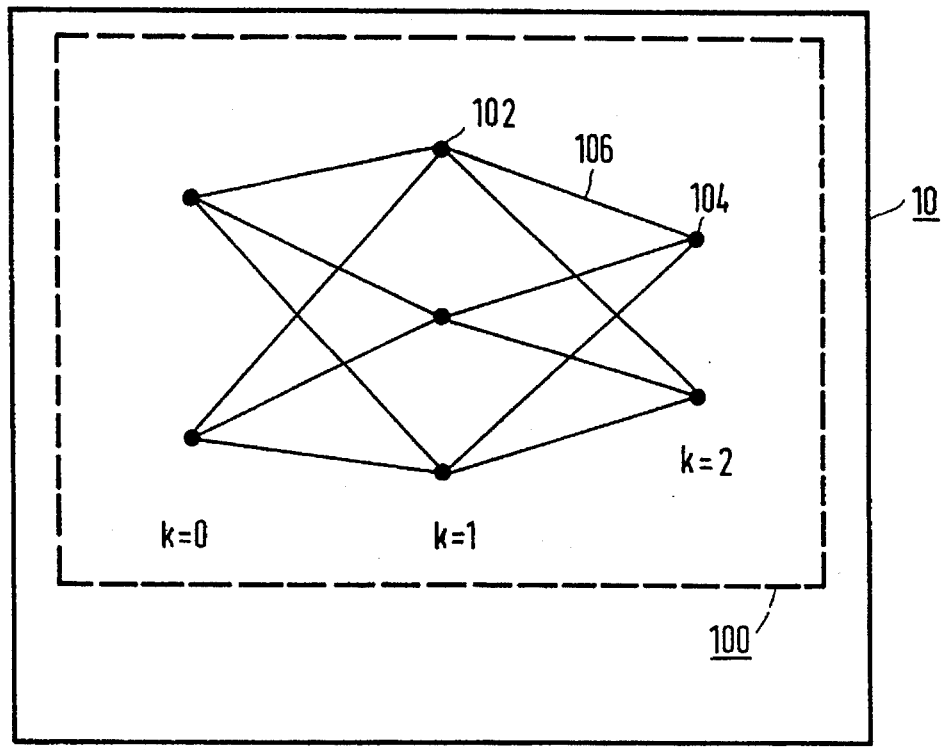

FIG.1

(i) $\quad \tau_{2ik} \dfrac{d^2 y_{ik}}{dt^2} + \tau_{1ik} \dfrac{dy_{ik}}{dt} + y_{ik} = F(s_{ik}, \delta_{ik})$ (ii) $\quad s_{ik} = \sum\limits_{j=1}^{N(k-1)} \left\{ w_{ijk}\, y_{j(k-1)} + v_{ijk}\, \dfrac{dy_{j(k-1)}}{dt} \right\} - \vartheta_{ik}$ (iii) $\quad F(s_{ik}, \delta_{ik}) = \dfrac{1}{\delta_{ik}} \ln \left( \dfrac{\cosh\left(\dfrac{s_{ik} + \delta_{ik}}{2}\right)}{\cosh\left(\dfrac{s_{ik} - \delta_{ik}}{2}\right)} \right)$ (iv) $\quad F(s_{ik}, \delta_{ik}) = \dfrac{1}{1 + \exp(-s_{ik})}$

FIG.2

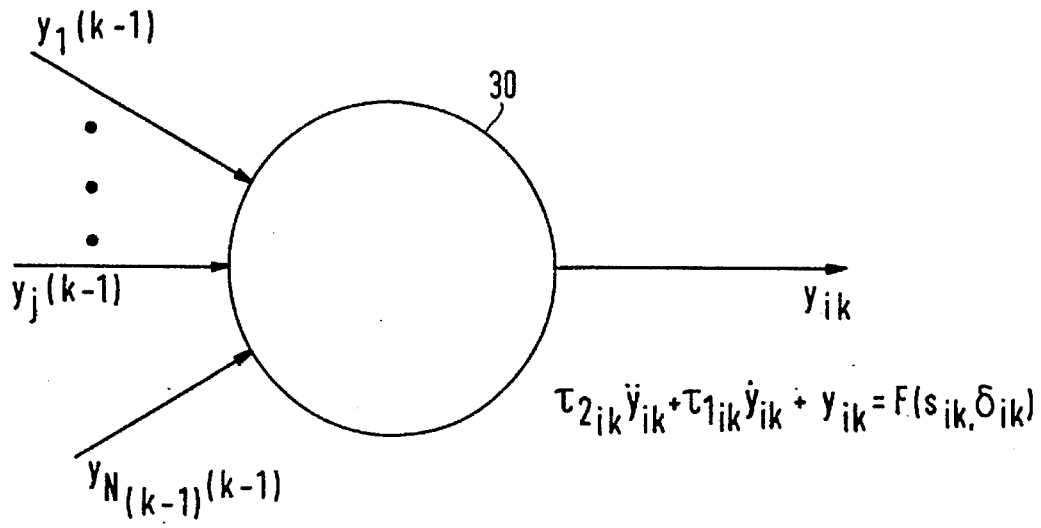

FIG.3

(v) $\quad \tau_{2ik}\dfrac{(z_{ik}-z'_{ik})}{h} + \tau_{1ik}\dfrac{(y_{ik}-y'_{ik})}{h} + y_{ik} = F(s_{ik},\delta_{ik})$ (vi) $\quad z_{ik} = \dfrac{(y_{ik}-y'_{ik})}{h}$ (vii) $\quad s_{ik} = \sum\limits_{j=1}^{N_{(k-1)}} \left\{ w_{ijk}\, y_{j(k-1)} + v_{ijk}\dfrac{(y_{j(k-1)}-y'_{j(k-1)})}{h} \right\} - \vartheta_{ik}$ (viii) $\quad y_{ik} = \dfrac{F(s_{ik},\delta_{ik}) + \left(\dfrac{\tau_{1ik}}{h} + \dfrac{\tau_{2ik}}{h^2}\right) y'_{ik} + \dfrac{\tau_{2ik}}{h} z'_{ik}}{1 + \dfrac{\tau_{1ik}}{h} + \dfrac{\tau_{2ik}}{h^2}}$ (ix) $\quad z_{ik} = \dfrac{y_{ik}-y'_{ik}}{h}$

FIG.4

$$(\text{x}) \quad \left. s_{ik} \right|_{t=0} = \sum_{j=1}^{N(k-1)} \{ w_{ij} y_{j(k-1)} \} - \vartheta_{ik}$$

$$(\text{xi}) \quad \left. y_{ik} \right|_{t=0} = F(s_{ik}, \delta_{ik})$$

$$(\text{xii}) \quad \left. z_{ik} \right|_{t=0} = 0$$

$$(\text{xiii}) \quad \frac{d s_{ik}}{dp} = \sum_{j=1}^{N(k-1)} \left\{ \frac{dw_{ijk}}{dp} y_{j(k-1)} + w_{ijk} \frac{dy_{j(k-1)}}{dp} \right.$$
$$\left. + \frac{dv_{ijk}}{dp} \frac{dy_{j(k-1)}}{dt} + v_{ijk} \frac{d}{dt}\left(\frac{dy_{j(k-1)}}{dp}\right) \right\} - \frac{d\vartheta_{ik}}{dp}$$

$$(\text{xiv}) \quad \frac{d\tau_{2ik}}{dp} \frac{dz_{ik}}{dt} + \tau_{2ik} \frac{d}{dt}\left(\frac{dz_{ik}}{dp}\right) + \frac{d\tau_{1ik}}{dp} \frac{dy_{ik}}{dt} + \tau_{1ik} \frac{d}{dt}\left(\frac{dy_{ik}}{dp}\right)$$
$$+ \frac{dy_{ik}}{dp} = \frac{dF}{ds_{ik}} \frac{ds_{ik}}{dp} + \frac{dF}{d\delta_{ik}} \frac{d\delta_{ik}}{dp}$$

$$(\text{xv}) \quad \frac{dz_{ik}}{dp} = \frac{d}{dt}\left(\frac{dy_{ik}}{dp}\right)$$

FIG.5

(xvi) $$\frac{\partial s_{ik}}{\partial p} = \sum_{j=1}^{N(k-1)} \left\{ \frac{\partial w_{ijk}}{\partial p} y_{j(k-1)} + w_{ijk} \frac{\partial y_{j(k-1)}}{\partial p} \right.$$

$$\left. + \frac{\partial v_{ijk}}{\partial p} \left( \frac{y_{j(k-1)} - y'_{j(k-1)}}{h} \right) + v_{ijk} \frac{1}{h} \left( \frac{\partial y_{j(k-1)}}{\partial p} - \frac{\partial y'_{j(k-1)}}{\partial p} \right) \right\}$$

$$- \frac{\partial \vartheta_{ik}}{\partial p}$$

(xvii) $$\frac{\partial y_{ik}}{\partial p} = \left\{ \frac{\partial F}{\partial s_{ik}} \frac{\partial s_{ik}}{\partial p} + \frac{\partial F}{\partial \delta_{ik}} \frac{\partial \delta_{ik}}{\partial p} - \frac{\partial \tau_{1ik}}{\partial p} z_{ik} \right.$$

$$+ \left( \frac{\tau_{1ik}}{h} + \frac{\tau_{2ik}}{h^2} \right) \frac{\partial y'_{ik}}{\partial p} - \frac{\partial \tau_{2ik}}{\partial p} \left( \frac{z_{ik} - z'_{ik}}{h} \right)$$

$$\left. + \frac{\tau_{2ik}}{h} \frac{\partial z'_{ik}}{\partial p} \right\} \bigg/ \left\{ 1 + \frac{\tau_{1ik}}{h} + \frac{\tau_{2ik}}{h^2} \right\}$$

(xviii) $$\frac{\partial z_{ik}}{\partial p} = \frac{1}{h} \left( \frac{\partial y_{ik}}{\partial p} - \frac{\partial y'_{ik}}{\partial p} \right)$$

FIG.6

$$(xix) \quad \left.\frac{ds_{ik}}{dp}\right|_{t=0} = \sum_{j=1}^{N(k-1)} \left\{ \left.\frac{dw_{ijk}}{dp} y_{j(k-1)}\right|_{t=0} + \left.w_{ijk}\frac{dy_{j(k-1)}}{dp}\right|_{t=0} \right\} - \frac{d\vartheta_{ik}}{dp}$$

$$(xx) \quad \left.\frac{dy_{ik}}{dp}\right|_{t=0} = \frac{dF}{ds_{ik}} \left.\frac{ds_{ik}}{dp}\right|_{t=0} + \frac{dF}{d\delta_{ik}} \left.\frac{d\delta_{ik}}{dp}\right|_{t=0}$$

$$(xxi) \quad \left.\frac{dz_{ik}}{dp}\right|_{t=0} = 0$$

FIG.7

$$(xxxvi) \quad S_{ik} = \sum_{j=1}^{N(k-1)} (w_{ijk} + j\omega v_{ijk}) Y_{j,(k-1)}$$

$$(xxxvii) \quad Y_{ik} = H_{im} Y_{mo}$$

$$(xxxviii) \quad Y_{ik} = T_{ik} \sum_{j=1}^{N(k-1)} (w_{ijk} + j\omega v_{ijk}) Y_{j,(k-1)}$$

$$= \sum_{j=1}^{(k-1)} H_{ij}^{(k)} Y_{j,(k-1)}$$

FIG.11

$$\text{(xxii)} \quad \frac{\partial s_{ik}}{\partial p} = \sum_{j=1}^{N(k-1)} w_{ijk} \frac{\partial y_{j(k-1)}}{\partial p} + v_{ijk} \left( \frac{\partial y_{j(k-1)}}{\partial p} - \frac{\partial y'_{j(k-1)}}{\partial p} \right) \frac{1}{h}$$

$$\text{(xxiii)} \quad \frac{\partial y_{ik}}{\partial p} = \left\{ \frac{\partial F}{\partial s_{ik}} \frac{\partial s_{ik}}{\partial p} + \left( \frac{\tau 1_{ik}}{h} + \frac{\tau 2_{ik}}{h^2} \right) \frac{\partial y'_{ik}}{\partial p} \right.$$

$$\left. + \frac{\tau 2_{ik}}{h} \frac{\partial z'_{ik}}{\partial p} \right\} \bigg/ \left\{ 1 + \frac{\tau 1_{ik}}{h} + \frac{\tau 2_{ik}}{h^2} \right\}$$

$$\text{(xxiv)} \quad \frac{\partial z_{ik}}{\partial p} = \left( \frac{\partial y_{ik}}{\partial p} - \frac{\partial y'_{ik}}{\partial p} \right) \frac{1}{h}$$

$$\text{(xxv)} \quad \frac{\partial s_{ik}}{\partial p} \bigg|_{t=0} = \sum_{j=1}^{N(k-1)} w_{ijk} \frac{\partial y_{j(k-1)}}{\partial p} \bigg|_{t=0}$$

$$\text{(xxvi)} \quad \frac{\partial y_{ik}}{\partial p} \bigg|_{t=0} = \frac{\partial F}{\partial s_{ik}} \frac{\partial s_{ik}}{\partial p} \bigg|_{t=0}$$

$$\text{(xxvii)} \quad \frac{\partial z_{ik}}{\partial p} \bigg|_{t=0} = 0$$

FIG.8

(xxviii) $\vec{p}^{(i,k)} = (w_{i1k}, w_{i2k}, \ldots, \vartheta_{ik}, v_{i1k}, v_{i2k}, \ldots, \delta_{ik}, \tau_{1ik}, \tau_{2ik})$ (xxix) $\delta\vec{p} = -\eta \nabla_p E_{tr}$ (xxx) $\delta\vec{p} = -\eta \nabla_p E_{tr} + \mu \delta\vec{p}_{previous}$

FIG. 9

(xxxi) $y_{ik} = y_{ik}^{steady} + \text{Re}(Y_{ik} \exp(j\omega t))$ (xxxii) $s_{ik} = s_{ik}^{steady} + \text{Re}(S_{ik} \exp(j\omega t))$ (xxxiii) $F(s_{ik}^{steady}, \delta_{ik}) = y_{ik}^{steady}$ (xxxiv) $S_{ik} \dfrac{\partial F}{\partial s_{ik}}\bigg|_{steady} = Y_{ik} + j\omega\tau_{1ik} Y_{ik} - \omega^2 \tau_{2ik} Y_{ik}$ (xxxv) $T_{ik} = \dfrac{Y_{ik}}{S_{ik}} = \dfrac{\dfrac{\partial F}{\partial s_{ik}}\bigg|_{steady}}{1 + j\omega\tau_{1ik} - \omega^2 \tau_{2ik}}$

FIG. 10

DYNAMIC NEURAL NET

FIELD OF THE INVENTION

The invention relates to an information processing system with a feed-forward neural net that is functionally comprised of a plurality of interconnected neurons. Each respective one of the neurons is operative to receive a respective plurality of neuron input signals for in response thereto producing a respective neuron output signal. The invention also relates to a method using such an information processing system for simulation of a dynamic system.

BACKGROUND ART

Neural Nets

A neural net handles information in a highly parallel and distributed manner. The neural net is functionally comprised of a plurality of elementary processing units, called neurons, that are interlinked through weighted interconnections, called synapses, thus forming a massively interconnected architecture. Each synapse scales the signal supplied by a neuron acting as a source and transfers the scaled or weighted signal to a further neuron acting as a destination. Each neuron typically receives a plurality of weighted input signals either via the synapses from other neurons or from a neural net input. In a conventional neural net, each neuron sums the weighted input signals and applies a non-linear function to the sum, thereby generating an output signal for transmission to other neurons.

Neural net operation is model-free. That is, neural net operation does not require a pre-specified algorithm to perform a given task. Instead, a neural net adaptively handles data while learning from examples. Processing in a neural net is achieved in a collective manner. The simple, simultaneous operation of individual neurons and the distribution of signals throughout the neural net result in the sophisticated functioning of the neural net as a whole. This kind of organization enables a plurality of neurons to collectively and simultaneously influence the state of an individual neuron according to the application of simple rules. The expression "feed-forward neural net" refers to the arrangement of neurons in a plurality of successive layers, wherein a neuron of a particular layer supplies its output signal to another neuron in the next layer. Such a neural net can be trained, e.g., by error-backpropagation, to carry out a specific processing task. The processing capacity acquired through learning is encoded in the plurality of synapses rather than in individual memory elements. A neural net is typically suitable for handling optimization problems, carrying out pattern recognition and performing classification tasks.

Simulator using neural net

European Patent Application EP-A 0 540 168 describes a simulator that serves to simulate an object to be controlled, such as an actual machine, and that includes a neural net. A model that represents properties of the machine is conventionally prepared in advance for a known type of simulator. In order to deal with discrepancies between the designed properties that govern the model and the machine's measured actual properties, a neural network is added to correct the known simulator's results for these discrepancies. The model's output is compared to the actual output of the machine and the neural net's operational parameters are adjusted to minimize the discrepancy. This increases the accuracy of the model. In a first embodiment, the neural net in the known simulator is preceded by a differentiating means for successively differentiating a signal to be processed and for supplying the signal value and the values of its first-order and higher-order time derivatives in parallel to the neural net. In a second embodiment, the neural net is preceded by a delay line for in parallel supplying signal values associated with successive moments in time to the neural net.

The classical approach to create a suitably compact model of a dynamic system is by forging the available knowledge about the dynamic system into a numerically well-behaving hand-crafted model. It may require several man-years and a great deal of knowledge and intuition to develop a satisfactory model for, e.g., a transistor device, an economic system, weather forecasting, turning modelling into an art on its own. Due to the complications met when trying to model a dynamic system for the exploration and explanation of the underlying principles onto which the model should be based, known modelling techniques may typically resort to curve-fitting in order to obtain the necessary accuracy and smoothness. This, however, introduces discretization and interpolation effects, which may well lead to model behaviour that deviates considerably from the dynamic system it is supposed to represent. More importantly, such an approach is useful in static or quasi-static modelling only. A fully dynamical model, i.e., one that reliably predicts a time-dependent response for any type of stimulus, is practically impossible to construct on the basis of curve-fitting and interpolation techniques alone, owing to the vast amount of samples required to provide a basis for creating any set of sample values possible in the stimulus signal.

OBJECT OF THE INVENTION

The invention recognizes the fact that prior art information processing systems of the kind mentioned in the preamble use neural nets that map input data onto output data in a static fashion. That is, the net's mapping of an input data vector onto an output data vector is exclusively determined by the instantaneous input data and is, for example, functionally independent of temporal effects, such as propagation delays, and of the preceding input data vectors. The known neural nets therefore essentially cannot exhibit a truly dynamic behaviour wherein both the evolution of input data items and their individual information contents govern the net's responses. Pre-processing as in the cited prior art does not alter the static character of the neural net employed.

Accordingly, it is an object of the invention to essentially extend neural net functionalities. It is a further object to provide an information processing system that has a neural net exhibiting dynamical behaviour. It is a further object to provide a simulator for a dynamic system, the simulator including a truly dynamical neural net. It is still another object to provide an information processing system that can be used as a fully automatic model generator.

SUMMARY OF THE INVENTION

To this end, the invention provides an information processing system of the kind mentioned in the preamble, characterized by a particular one of the neurons being operative to produce a particular neuron output signal that substantially is a function of the neuron input signals to the particular one of the neurons and of at least one of following quantities: a rate of change of at least one of the neuron input signals; a rate of change of the particular neuron output signal.

Basically, the input/output behaviour of the particular neuron in the invention is governed by a differential equation or an integral equation that involves one or more temporal operators such as a time-derivative or an integration over a time interval. The aforesaid rates of change are to be understood as including, for example, a first-order or a higher-order time derivative, or any combination of time derivatives. In contrast thereto, a neuron in a conventional artificial neural net produces a neuron output signal having a value at a particular moment that is a function solely of the values of the neuron input signals at the same moment, lacking any explicitly temporal effect such as explicit dependencies on rates of change or time integration. An information processing system in the invention therefore is capable of exhibiting truly dynamic behaviour, e.g., signal-dependent delay effects, phase shifts or dispersion, and memory effects.

The output of the feed-forward neural net can be made to change gradually upon receiving an abruptly changing input signal by introducing time-integrating effects. Alternatively, the output of the net can be made to change abruptly upon receiving a gradually changing input signal by introducing time-differentiation. This may well conform with practical applications of the neural net, e.g., as an associative controller for highly non-linear dynamic processes. The neural net of the invention can be employed to handle information residing in the evolution of a signal pattern over time, in contrast to conventional neural nets that process information that is present in a pattern of signal values prevailing only at a distinct moment in time. Even more importantly, the neural net of the invention is advantageously used for automatic modelling tasks as is described further below.

Preferably, the function depends on a linear combination of the neuron input signals to the particular one of the neurons, and on at least one of the following: a first-order time derivative of the particular neuron output signal; a second-order time derivative of the particular neuron output signal; a first-order time derivative of at least a specific one of the neuron input signals to the particular neuron.

In a more specific embodiment, the particular neuron is operative to render a further linear combination of the particular neuron output signal and of first-order and second-order time derivatives of the particular neuron output signal substantially equal to a non-linear function of a first argument including the neuron input signals to the particular neuron, and of a second argument involving a first-order time derivative of at least one of the neuron input signals to the particular neuron. In this manner the particular neuron is made to act as a band-pass filter. A band-pass filter approximates typical behaviour of a large variety of dynamic systems. Accordingly, such a neuron is an important building block in system modelling as is discussed below.

In order to enable the feed-forward neural net in the information processing system to learn a particular task, the net is rendered adaptive. To this end, the neural net is provided with one or more of the particular neurons as introduced above, wherein the function involves at least one parameter whose value can be modified. The information processing system then comprises means to adjust the value of the parameter. Now, truly dynamical non-linear systems can be mapped onto the net to accommodate, e.g., signal phase shifts, signal propagation delays or other characteristics of dynamical behaviour in actual dynamic systems. Application is envisaged in fields that deal with non-linear high-dimensional phenomena, such as in semiconductor modelling, electronic circuit simulation, weather forecasting, process control, economic systems, logistic systems, flight simulation, computer-supported manufacturing, etcetera.

The mapping of truly dynamic systems onto the neural net in the invention provides a simulator for the dynamic system. This is accomplished as follows. The evolution in time of the dynamic system's responses to one or more pre-specified stimuli is monitored. The neural net now is going to be trained to produce an output descriptive of the monitored response when supplied with an input that in turn is descriptive of the corresponding pre-specified temporal stimulus.

The training comprises following steps. The feed-forward neural net is initialized by assigning values to its operational parameters, e.g., random values or values that take into account some knowledge acquired in advance about the dynamic system to be modelled. Then, the input descriptive of the stimulus is supplied to the net. The output obtained from the net is compared with the desired output. If a result of the comparing is not acceptable according to a predetermined criterion, then the values of the parameters are updated according to an updating procedure, for example, a gradient descent algorithm, whereupon the input is again supplied to the net and the newly obtained output is compared with the desired output. If the result of the comparing is acceptable according to the criterion, then the training is terminated and the last obtained value is validated. The trained net can be used as a representative of the dynamic system. On the other hand, training may be performed repetitively in order to let the net adapt to a continually changing environment.

In case the neural net is implemented in software, training can be carried out, for example, as follows with help of a training set comprising a plurality of time domain tuples. Each specific one of the time domain tuples contains a time indicator of a specific moment in time, an input vector representing one or more samples of one or more stimuli supplied at the specific moment in time to the dynamic system to be modelled, and a target output vector representing the response or responses as (should be) provided by the dynamic system at the aforesaid specific moment in time. The time indicators and the corresponding input vectors are supplied to the neural net that, in turn, produces output vectors. Each particular pair of time indicator and corresponding input vector gives rise to a particular output vector that is considered to correspond to the time indicator in said pair. The obtained output vector is compared to the desired target output vector corresponding to the same time indicator. The discrepancies between all compared target output vectors and obtained output vectors are accumulated into a cost function whose value is to be minimized by updating the net's parameters, using procedures similar to those for training conventional neural nets. Once trained, the neural net will exhibit a dynamic behaviour similar to that of the dynamic system that was to be modelled. Moreover, due to the capability to generalize, inherent to a neural net, the trained net will respond to new inputs similarly as would the dynamic system do under new stimuli.

The thus trained neural net can be used in its software form on a host computer system. Also the neural net software can be mapped onto hardware, e.g., an electronic circuit. Furthermore, the neural net software, e.g., in the form of a set of differential equations with parameters whose values were specified during the training procedure, can be loaded in a simulator for further processing.

Alternatively, or in addition to the time domain training, the neural net in the information processing system of the invention can be trained with help of a training set of frequency domain tuples.

Consider a dynamic system that is supplied with a stimulus composed of a constant bias portion and a varying portion that is sufficiently weak to allow for a linearization around the bias conditions. Consequently, if the dynamic system to be modelled is supplied with a harmonically varying stimulus of a given frequency, the dynamic system furnishes a harmonically varying response of the same given frequency. The ratio between response and stimulus then is represented by a generally complex transfer function of the frequency. A dynamic system having multiple inputs and multiple outputs is characterized by a transfer matrix, whose respective components are formed by respective complex transfer functions.

The neurons in the information processing system of the invention as described above exhibit a behaviour that typically is specified by a differential equation involving first- and second-order time-derivatives of the neuron output signals, and first-order time-derivatives of the neuron input signals. The differential equations can be linearized around a bias condition in order to legitimately apply harmonic analysis. The net's behaviour then can be described by a transfer matrix involving the bias conditions and specifying the complex input/output character in dependence on the frequency. The net's parameters occur as parameters in this transfer function. Now, if the net is supplied with harmonically varying inputs, descriptive of stimuli that would be supplied to the dynamic system to be modelled, then the net will furnish harmonically varying outputs. Adaptation of the parameters in an updating procedure then trains the net to supply outputs descriptive of the responses as provided by the dynamic system under harmonically varying stimuli.

The neural net, being implemented in software, can be trained with the help of a training set comprising a plurality of frequency domain tuples. Each specific one of the frequency domain tuples contains a bias indicator indicative of one or more specific bias conditions, a frequency indicator for a specific frequency, and a target transfer matrix corresponding to the specific bias conditions and the specific frequency and descriptive of the transfer function of the dynamic system. For the specified bias conditions, the obtained transfer matrix of the net is compared with the relevant target transfer matrix. The discrepancies between all compared pairs of target transfer matrices and obtained transfer matrices are accumulated into a cost function whose value is to be minimized by modifying the net's parameters, using procedures similar to those for training conventional neural nets. Once trained, the neural net will exhibit a dynamic behaviour similar to that of the dynamic system that was to be modelled. Moreover, due to the capability to generalize, inherent to a neural net, the trained net will respond to new inputs similarly as would the dynamic system do under new stimuli.

The invention does not employ the pre-processing of the cited prior art document EP-A 0 540 168 to take account of signal evolution. The i-th component of an input vector supplied to the known neural net has a value representative of the (i−1)-th order time derivative of some signal to be processed by the net. Still, the neural net in the prior art is fully static. In the invention, it is the net that is made fully dynamical by introducing temporal operators into the neuron functionality.

An information processing system of the invention is advantageously used as an automatic model generator. First, the topology of the system's neural net is chosen in terms of the number of layers, and the number of neurons for each of the layers. Each neuron acts as a non-linear band-pass filter, whose output behaviour is described by a second-order differential equation with a source term that is a non-linear function involving a linear combination of the neuron's input signals and involving a linear combination of the first order time derivatives of the input signals. The values of the parameters in the equations are to be determined by training the neural net. The neural net is taught to display the desired dynamic behaviour by the methods just described, wherein the values of the parameters are iteratively modified according to some optimization procedure, such as error back-propagation under gradient descent. When the parameter values have been determined sufficiently accurately in the training phase, one has obtained a model of the dynamic system either in hardware, namely a trained neural net, or in software, namely a set of coupled differential equations.

The hardware solution, i.e., the trained neural net, can be used as a building block within an architecture, e.g., of a controller, made up of a plurality of such neural nets, each net being trained to exhibit one or more dedicated dynamic stimulus-response characteristics. Such an architecture has a significant degree of uniformity, at least at the neuron level.

The software solution, i.e., the set of differential equations, is, for example, mapped onto a microcode for a μ-controller to provide a dedicated control characteristic. Within electronic circuit simulation, the software representation can mapped on an equivalent electric circuit description in terms of linear and non-linear elements such as sources, capacitors, resistors and inductances. The equivalent circuit description thereupon is supplied to a well known circuit simulator, such as SPICE, for further tests, e.g., with regard to its own functionality or with regard to its collaboration with other circuitry.

BRIEF DESCRIPTION OF THE DRAWING

The invention is explained below by way of example and with reference to the accompanying drawing, wherein:

FIG. 1 gives an example of a feed-forward neural net; and

FIGS. 2–11 give formulae specifying the activity of a neuron in a net of the invention.

DETAILED DESCRIPTION OF THE EMBODIMENTS.

Net Configuration

FIG. 1 gives an example of a configuration of an information processing system 10 that comprises a feed-forward neural net 100. Net 100 is functionally comprised of K+1 layers (K=2 in this example), each layer k=0, 1, . . . , K having $N_k$ neurons. In the example, there is an input layer k=0, one hidden layer k=1, and an output layer k=2. The dots in each layer, such as dots 102 and 104, represent individual neurons. Neurons in a next layer have their inputs connected only to outputs of neurons in the preceding layer through synapses, such as synapse 106 between source neuron 102 and destination neuron 104. A synapse between a source neuron "j" in layer "k-1" and a destination neuron "i" in layer "k" assigns a weight $w_{ijk}$ to the signal $y_{j,(k-1)}$ transmitted from the source neuron to the destination neuron. The destination neuron "i" in layer "k" produces a neuron output signal $y_{i,k}$. Typically, the destination neuron is connected to a plurality of source neurons and receives a plurality of weighted input signals. In conventional neural nets, the destination neuron provides a neuron output signal, whose value is a non-linear function of a linear combination of the values of the received neuron input signals. As only the instant values of the input and output signals are interrelated, the conventional net performs a static mapping.

In the invention, the individual neurons 102 and 104 are much more powerful, in that the neuron produces a neuron output signal depending on the received neuron input signals through temporal operators, such as a time-differential operator. Mathematically, the neuron output signal then is a solution of a differential equation with a source term determined by the neuron input signals. The output of net 100 therefore can be made to change gradually upon receiving varying input signals. This conforms more with practical applications of the neural net, e.g., as an associative controller. Moreover, the operational parameters of net 100 that determine the net's temporal behaviour can be adapted by training net 100 to mimic pre-specified behaviour, e.g., the stimulus-response characteristics as displayed by an actual dynamic system.

Dynamic Neuron Behaviour; Time Domain

The neuron activity in the invention is now discussed with reference to FIGS. 2–11.

FIG. 2 gives formulae to specify the neuron's operation. Neuron output signal $y_{i,k}$ of a neuron "i" in layer "k" in this example obeys the second-order linear differential equation (i). The notation $y_{i,0}$ is reserved for indicating the input signal to an input node "i" of neural net 100. A linear combination of the values of signal $y_{i,k}$, its first-order derivative $dy_{i,k}/dt$ and of its second-order derivative $d^2y_{i,k}/dt^2$ scaled by coefficients $\tau_{1,ik}$ and $\tau_{2,ik}$, respectively, equals a source term $F(s_{i,k}, \delta_{i,k})$. Source term F is a non-linear function of the argument $s_{i,k}$. The expression for quantity $s_{i,k}$ is given by formula (ii). The quantity $s_{i,k}$ involves a linear combination of the neuron output signal values $y_{i,(k-1)}$ of the neurons in preceding layer "k-1" functionally connected to neuron "i" in layer "k". Signal value $y_{i,(k-1)}$ is weighted by synaptic weight $w_{ijk}$. The quantity $s_{i,k}$ also involves a linear combination of the values of the first-order time derivatives $dy_{i,(k-1)}/dt$ associated with the neurons of layer "(k-1)" connected to neuron "i" in layer "k". Each first-order time derivative $dy_{i,(k-1)}/dt$ is weighted by a respective coefficient $v_{ijk}$. The $w_{ijk}$-term and the $v_{ijk}$-term specify the operation of the synapse that functionally couples a source neuron "j" in layer "k-1" to a destination neuron "i" in layer "k". The term $\theta_{i,k}$ indicates the individual threshold of neuron "i" in layer "k". A first example of source term F is specified in formula (iii). A second example of source term F is given in formula (iv). Source term F typically is a monotonically increasing sigmoid function of $s_{i,k}$, wherein transition parameters $\delta_{i,k}$ determine the appropriate scale of change of source term F.

Note that for parameters $\tau_{1,ik}$ and $\tau_{2,ik}$ both equal to zero and weights $v_{ijk}$ all equal to zero, formula (i) describes the static behaviour of a conventional neuron that maps a linear combination of neuron input signals only onto a neuron output signal via a non-linear function. The output of the neuron in the invention, however, takes history into account and is a consequence of the presence of the terms with non-vanishing parameters $\tau_{1,ik}$ and $\tau_{2,ik}$.

Formulae (i)–(iv) describe a non-linear band-pass filter for appropriate parameter settings. The amplitude of the $v_{ijk}$-terms grows with frequency and dominates the $w_{ijk}$-terms and the thresholds for sufficiently high frequencies. The $v_{ijk}$-terms help detect rapid changes in the neuron input signals to neuron "i" of layer "k". However, the $\tau_{1,ik}$-term also grows with increasing frequency leading to a transfer function amplitude in the order of $v_{ijk}/\tau_{1,ik}$, until the $\tau_{2,ik}$-term will gradually reduce the high-frequency amplitude to zero. Parameter $\tau_{1,ik}$ provides the capability for time-integration, thereby also time-averaging the input $s_{i,k}$. This is the same kind of low-pass filtering that is achieved through a voltage source arranged in parallel with a series arrangement of a resistor and a capacitor.

FIG. 3 visualizes a single neuron 30, being denoted as a neuron "i" in layer "k". Neuron 30 receives from the neurons in preceding layer "k-1" the neuron input signals $y_{1,(k-1)}, \ldots, y_{j,(k-1)}, \ldots, y_{N(k-1),(k-1)}$ and produces the neuron output signal $y_{i,k}$ as discussed above.

In case the neural net is, for example, to be implemented on a digital computer, formulae (i)–(iv) need to be cast into a format that can be handled numerically. Many general algorithms are available for numerical integration, providing trade-offs between accuracy, time step size and algorithmic complexity. For example, the Backward Euler integration method provides simplicity and numerical stability for variable time step size. Formulae (v)–(vii) in FIG. 4 discussed next represent the discretized form of formulae (i)–(ii). The time step is denoted by the letter "h". The time-dependent quantities $y_{i,k}$ and $y_{i,(k-1)}$ in formulae (v)–(vii) denote the values of the signals at time "t", and the time-dependent quantities with an accent, $y'_{i,k}$ and $y'_{i,(k-1)}$, refer to the values of the relevant signals at the time "(t-h)".

Note that second-order differential equation (i) is converted into two first-order difference equations (v)–(vi). Equations (v)–(vii) can be solved explicitly in $y_{i,k}$ and $z_{i,k}$. The result is the set of equations (viii) and (ix) in FIG. 4, for which the $s_{i,k}$ are obtained by straightforward substitution in (vii). Initial states directly follow from forward propagation of the explicit equations under the conditions for a constant steady state, as given by equations (x)–(xii) of FIG. 5.

Expressions for transient sensitivity, i.e., the partial derivatives with respect to operational parameters of the neural net, are obtained by first transforming second-order differential equation (i) into two first-order differential equations, similar to expressions (v) and (vi), and thereupon differentiating these and expression (ii) with respect to any parameter denoted hereinafter by the letter "p". The result is given by equations (xiii)–(xv) in FIG. 5. Equations (xiii)–(xv) are discretized and rewritten for use with the Backward Euler integration method, giving expressions (xvi)–(xviii) of FIG. 6. The initial values for the partial derivatives follow from forward propagation of the steady state equations (xix)–(xxi) in FIG. 7.

Particular choices for the parameter "p" must be made to obtain expressions for an actual implementation. If parameter p relates to layer k of the neural net, i.e., parameter p occurs explicitly in the expressions for $y_{i,k}$, parameter p can be one of the parameters $\delta_{i,k}$, $\theta_{i,k}$, $w_{ijk}$, $v_{ijk}$, $\tau_{1,ik}$ or $\tau_{2,ik}$. It is important to realize that expressions such as (xvi)–(xviii) lead to "time-branching" relationships involving data associated with previous moments in time. A tree of dependencies evolves when looking backward into the network, in the sense that a derivative at a previous time moment may itself depend not only on data for that moment, but also on still older data. The necessity of this multiple time-moment handling becomes clear when one considers the multi-layer network as representing a higher-order differential equation, which after direct first-order discretization would involve values for n+1 time moments, n being the order of the differential equation. If parameter p is associated with a preceding layer, equations (xvi)–(xviii) can be simplified, and the partial derivatives then can be found recursively from the expressions (xxii)–(xxiv) in FIG. 8, until one hits the layer where parameter "p" resides. The actual evaluation can be done in a feed-forward manner to avoid recursion. Initial partial derivative values in this scheme for parameters in preceding layers follow from equations (xxv)–(xxvii) in FIG. 8.

All parameters for a single neuron "i" in the "k"-th layer together are denoted as a neuron parameter vector $p^{(i,k)}$, such as in expression (xxviii) in FIG. 9. The collection of all parameter vectors $p^{(i,k)}$ for all neurons in all layers is a net parameter vector p, that is regarded as a concatenation of all neuron parameter vectors $p^{(i,k)}$ being strung together. The values for the parameters, i.e., for the components of net parameter vector p, have to be determined through some kind of optimization on training data. For example, when the neural net is to be trained to model a semiconductor device, the magnitudes of the dc voltages applied to the device are used as input data to the neural net and the measured magnitudes of the corresponding terminal currents of the device are taken as the net's desired or target output for the constant steady state. For the transient behaviour, complete waveforms involving voltages and currents as functions of time are needed to describe the input and target output. It is assumed that the transient behaviour of the network is initialized by a steady state analysis at time t=0 in each wave form. The learning phase of the network consists of trying to model all the specified steady state and transient behaviour as closely as possible. This leads to an optimization problem. The constant steady state case can be treated as a special case, namely, for t=0 only.

A complete training set $S_{tr}$ for the network is now defined for one or more different input signals to the device, the training set being a collection of tuples. Each tuple is a group of samples relating to the time domain, and comprises a time moment indicator $t_{s,i}$, the network input vector $x^{(0)}_{s,i}$ and the target output vector $x_{s,i}$, wherein the subscripts "s" and "i" refer to the value of the "s"-th signal at the "i"-th time moment. The network input vector $x^{(0)}_{s,i}$ and the target output vector $x_{s,i}$ represent the stimuli supplied to the actual dynamical system to be modelled and the response produced by the actual dynamical system, respectively, all at the i-th moment in time. In short:

$$S_{tr} = \{\text{signals } s, \text{ samples } i: (t_{s,i}, x^{(0)}_{s,i}, x_{s,i})\}$$

The local time step size "h" introduced above is simply the difference $t_{s,i+1} - t_{s,i}$. Only one time sample per signal "s", namely $t_{s,i=0}$, is used to specify the constant steady state behaviour for a particular bias condition, e.g., a dc state in case of aforesaid semiconductor device. The target outputs $x_{s,i}$ in general will be different initially from the obtained network outputs $x^{(K)}(t_{s,i})$ that result from network inputs $x^{(0)}_{s,i}$ at time moment $t_{s,i}$.

A time domain error measure $E_{tr}$ is defined to accumulate errors that represent the discrepancy between the output actually delivered by the network and the desired target output. The errors are accumulated with respect to all network outputs, all moments in time indexed by "i", and all signals indexed by "s":

$$E_{tr} = \Sigma_s \Sigma_i \epsilon_{tr}(x^{(K)}(t_{s,i}) - x_{s,i});$$

wherein the scalar function $\epsilon_{tr}$ of a vector argument represents the individual contribution of a particular one of the signals at a specific moment in time to the overall error $E_{tr}$. Typically, $\epsilon_{tr}$ is chosen to be the inner product of the argument by itself, scaled by a factor ½.

A variety of procedures is available to minimize $E_{tr}$ with respect to the parameters of net parameter vector p. One example is that of the steepest descent, also referred to as gradient descent, well known from error-backpropagation in the field of trainable neural nets. It is one of the most popular updating schemes, since the backpropagation using steepest descent involves local rules only. That is, each neuron only needs biasing information entering in a forward pass through its input weights and error sensitivity information entering in a backward pass through its output. Steepest descent has its shortcomings in that performance is relatively poor, i.e., a large number of iterations are needed, and convergence towards an optimum cannot be guaranteed. Many variations are known to exist on the theme of steepest descent itself, e.g., the procedure wherein an additional momentum term is considered or wherein searches are restricted to particular gradients. Note that optimization and convergence techniques are a discipline in itself and that the invention is not limited to application of the steepest descent method. The interested reader is referred to the generally available vast literature on optimization techniques.

Steepest descent implies that the update vector for the network parameters is calculated from formula (xxix) in FIG. 9. That is, the increment $\delta p$ of vector p is proportional to the gradient of time domain error measure $E_{tr}$ in the vector space for p. The proportionality coefficient $\eta$ is called the "learning rate" and determines the update step size. A variation of the steepest descent method uses an additional momentum term in the expression for the update vector $\delta p$, as given by formula (xxx) in FIG. 9. The momentum term is proportional to the previously calculated update vector $\delta p_{previous}$ by a proportionality coefficient $\mu$.

Typical values for $\eta$ and $\mu$ used in small static backpropagation networks with a conventional sigmoid neuron activation function F are $\eta=0.5$ and $\mu=0.9$. Steepest descent is highly sensitive to proper value choice of $\eta$ and $\mu$, either in that convergence develops slowly or in that wild non-convergent parameter oscillations are liable to occur.

The neuron output signal $y_{i,K}$ of a neuron "i" in the last layer K in neural net 100 may be scaled and/or shifted in order to keep the neuron output signal within a meaningful range. The scaling by a scaling factor $\alpha_i$ and shifting by an amount $\beta_i$ may also be subjected to the adaptive operations as performed on the other parameters of the net included in vector p discussed above, in order to optimize the net's performance.

Dynamic Neuron Behaviour; Frequency Domain

The dynamic behaviour of the neuron in the system of the invention is discussed above in terms of time-derivatives. In an alternative formulation for small signals, the dynamic behaviour is now presented in terms of frequency. The invention therefore is rendered applicable to also handle frequency domain data as is explained below.

The variables $y_{i,k}$ and $s_{i,k}$ in equations (i)–(iv) each are considered here to be composed of a time-independent portion, $y^{steady}_{i,k}$ and $s^{steady}_{i,k}$, and a harmonic portion, $Re(Y_{i,k} \exp(j\omega t))$ and $Re(S_{i,k} \exp(j\omega t))$, with sufficiently small complex amplitudes $Y_{i,k}$ and $S_{i,k}$ to justify linearization of the equations around the steady state. This is represented in equations (xxxi) and (xxxii) in FIG. 10. Substitution of (xxxi) and (xxxii) in formula (ii) yields expressions (xxxiii) and (xxxiv), the latter of which giving the single-neuron transfer function of equation (xxxv).

The small-signal relationships among the layers of net 100 are now considered. For layer k, substitution of (xxxi) and (xxxii) into (ii) and retaining only the small-signal terms lead to equation (xxxvi) of FIG. 11. The small-signal input to neuron m of layer k=1 of net 100 is taken to be $Re(Y_{m,0} \exp(j\omega t))$. The small-signal output of net 100 is supplied by layer K. The small-signal output of neuron i residing in output layer k=K is denoted by $Re(Y_{i,K} \exp(j\omega t))$. The small-signal output of the net resulting from a small-signal input for a given bias "b" and for a given frequency ω can be characterized by a generally complex network transfer matrix $H_b(\omega)$. Matrix $H_b(\omega)$ relates the inputs $Y_{m,0}$ to the outputs $Y_{i,K}$ through equation (xxxvii). The complex matrix element $H_{im}$ of matrix $H_b(\omega)$ is therefore the ratio of $Y_{i,K}/Y_{m,0}$ as obtained from a device by observing the i-th output while keeping all but the m-th input constant, i.e., while having only the m-th input contributing to the i-th output. The transfer relation between successive layers k-1 and k follows from combining (xxxv) of FIG. 10 with (xxxvi) of FIG. 11. The combination yields equation (xxxviii). From the latter the transfer matrix $H^{(k)}$ is derived, whose component $H^{(k)}{}_{ij}$ is the ratio of $Y_{i,k}/Y_{j,k-1}$ as obtained from a neuron "i" by observing its output while keeping all but the j-th input to neuron "i" constant. For complex amplitudes of inputs to layer k=1 equal to unity for one of the neurons of layer k=1, while all other neurons of layer k=1 receive zero input, equation (xxxviii) is simply iteratively applied to obtain the expressions for the components of network transfer matrix $H_b(\omega)$.

The values of the components $H_{im}$ are to be optimized through a learning procedure somewhat similar to the one discussed above for the time domain. The training data $S_{ac}$ for the network now comprises samples for one or more different bias conditions as a collection of tuples, each being indicative of respective frequency and the associated target network transfer matrix $H_{b,i}$ for that respective frequency and bias condition. In short:

$$S_{ac}=\{\text{bias b, samples i: } (\omega_{b,i}, H_{b,i})\},$$

wherein index "b" identifies a particular one of a variety of bias conditions considered during training, and wherein index "i" refers to a particular one of the frequencies considered during training.

The desired target transfer matrix $H_{b,i}$ for a specific frequency $\omega_{b,i}$ and specific bias condition "b" is, e.g., derived from measurements conducted on the dynamic system to be modelled. The transfer matrix obtained from the net is compared to the desired target transfer matrix for that particular frequency and bias conditions. If the discrepancy between the obtained and desired matrices is not acceptable, then the net's operational parameters are updated. The updating procedure uses an expression indicative of the aggregate error in terms of the difference between aforesaid desired target transfer matrix and the obtained transfer matrix $H_b(\omega_i)$ actually obtained through the net for the corresponding bias condition "b" and frequency "i", according to:

$$E_{ac}=\Sigma_b\Sigma_i\epsilon_{ac}(H_b(\omega_i)-H_{b,i});$$

wherein the scalar function $\epsilon_{ac}$ of a matrix argument represents the individual contribution of a particular one of the matrix differences to the overall error $E_{ac}$. Typically, the function $\epsilon_{ac}$ of a complex matrix A is chosen to be:

$$\epsilon_{ac}(A)=\Sigma_{m,n}\tfrac{1}{2}(A^*_{mn}A_{mn})=\Sigma_{m,n}\tfrac{1}{2}\|A_{mn}\|^2$$

Updating of the parameters to minimize $E_{ac}$ may be accomplished using a gradient descent method involving partial derivatives of $H_b(\omega_i)$ with respect to the parameters p, in a similar manner as discussed for the time domain. Similarly, scaling may be included as discussed above.

Time domain training and frequency domain training can be combined in a single procedure by defining a combined overall error $E_{comb}$ as some linear combination of $E_{tr}$ and $E_{ac}$ introduced above:

$$E_{comb}=\lambda_1 E_{tr}+\lambda_2 E_{ac};\; \lambda_1\geq 0, \lambda_2\geq 0;$$

and minimizing $E_{comb}$.

I claim:

1. An information processing system comprising a processor and memory coupled to the processor arranged to form a feed-forward neural net including a plurality of interconnected neurons, each neuron having a plurality of inputs to receive a respective plurality of neuron input signals and calculating means for producing an output signal, that is a function of at least one of said neuron input signals and of at least one of following quantities: a rate of change of at least one of said neuron input signals; and a rate of change of the particular neuron output signal.

2. The system of claim 1, wherein the output signal is a function of a linear combination of the neuron input signals to the particular one of the neurons, and at least one of the following: a first-order time derivative of the particular neuron output signal; a second-order time derivative of the particular neuron output signal; and a first order time derivative of at least a specific one of the neuron input signals to the particular neuron.

3. The system of claim 2, wherein the calculating means generates a further linear combination of the particular neuron output signal and of first order and second-order time derivatives of the particular neuron output signal substantially equal to a non-linear function of a first argument including the neuron input signals to the particular neuron, and of a second argument involving a first-order time derivative of at least one of the neuron input signals to the particular neuron.

4. The system of claim 1, wherein the function involves at least one parameter and wherein the system comprises means to adjust a value of the parameter.

5. A method of training the information processing system of claim 4 to produce a desired output resulting from a pre-specified input to the neural net, the training comprising the steps of:

(a) initializing the neural net by assigning a value to the at least one parameter;

(b) supplying the pre-specified input to the neural net;

(c) comparing an obtained output of the net, acquired as a result of the pre-specified input, to the desired output;

(d) if a result of the comparing is not acceptable according to a predetermined criterion, then updating the value of the parameter according to an update procedure and returning to step b);

(e) if the result of the associating is acceptable according to the criterion, then terminating the training and validating the last obtained value.

6. The method of claim 5, wherein the neural net is implemented on a computer included in the information processing system, and wherein supplying the pre-specified input includes supplying a plurality of time domain tuples, each respective one thereof comprising:

a time indicator indicative of a respective time moment;

a respective input sample corresponding to the respective time moment;

and wherein the comparing includes:

determining a discrepancy between an obtained respective output sample, produced by the net as a result of the respective input sample, and a respective desired output sample corresponding to the respective time moment.

7. The method of claim 6 in which the neural net comprises at least one of the following: an electronic circuit; a simulator system.

8. The method of claim 5, including training the neural net to produce a respective harmonic output of a respective given frequency when supplied with a respective harmonic input of said respective frequency through a respective desired transfer matrix, the training comprising the steps of:

(a) determining a respective obtained transfer matrix for the respective frequency;

(b) comparing the respective obtained transfer matrix to the respective desired transfer matrix;

(c) if a result of the comparing is not acceptable according to a predetermined criterion, then updating the value of the parameter according to an update procedure and returning to step a);

(d) if the result of the comparing is acceptable according to the predetermined criterion, then terminating the training.

9. A method of training the information processing system of claim 4, comprising training the neural net to produce a respective harmonic output of a respective given frequency when supplied with a respective harmonic input of said respective frequency through a respective desired transfer matrix, the training comprising the steps of:

a) initializing the neural net by assigning a value to the at least one parameter;

b) determining a respective obtained transfer matrix for the respective frequency;

c) comparing the respective obtained transfer matrix to the respective desired transfer matrix;

d) if a result of the comparing is not acceptable according to a predetermined criterion, then updating the value of the parameter according to an update procedure and returning to step b);

e) if the result of the associating is acceptable according to the criterion, then terminating the training and validating the last obtained value.

10. The method of claim 9, wherein the neural net is implemented on a host computer included in the information processing system.

11. The method of claim 10 in which the neural net comprises at least one of the following: an electronic circuit; a simulator system.

12. The method of claim 9, including training the neural net to produce a respective harmonic output of a respective given frequency when supplied with a respective harmonic input of said given frequency in which the input is processed through a respective desired transfer function having a respective bias condition, comprising determining respective quiescent states of the transfer function from the bias condition.

13. The system of claim 1, comprising a computer programmed to function as the neural net.

* * * * *